(12) United States Patent
Hoffer

(10) Patent No.: US 8,376,472 B1
(45) Date of Patent: Feb. 19, 2013

(54) PERMANENT AIR LOCKING MECHANISM

(76) Inventor: Erik H. Hoffer, Punta Gorda, FL (US)

(*) Notice: Subject to any disclaimer, the term of this patent is extended or adjusted under 35 U.S.C. 154(b) by 217 days.

(21) Appl. No.: 12/925,203

(22) Filed: Oct. 15, 2010

Related U.S. Application Data

(60) Provisional application No. 61/252,786, filed on Oct. 19, 2009.

(51) Int. Cl.
*B60R 25/08* (2006.01)

(52) U.S. Cl. ............ 303/89; 303/123; 188/265; 70/179; 180/287

(58) Field of Classification Search .................... 303/89, 303/7, 123, DIG. 3; 188/265, 353; 70/179, 70/180, 176; 137/383, 385; 180/287; 280/428
See application file for complete search history.

(56) References Cited

U.S. PATENT DOCUMENTS

| | | | | |
|---|---|---|---|---|
| 3,515,442 A * | 6/1970 | Whittemore | .................... | 303/89 |
| 3,625,573 A * | 12/1971 | Conn | ............................... | 303/89 |
| 3,770,324 A * | 11/1973 | Stevenson et al. | ................. | 303/9 |
| 4,040,675 A * | 8/1977 | Richmond et al. | .............. | 303/89 |
| 4,946,130 A * | 8/1990 | Kooiman | ......................... | 251/95 |
| 5,390,768 A * | 2/1995 | Borkowski | ................ | 188/112 R |
| 5,688,027 A * | 11/1997 | Johnson | ......................... | 303/89 |
| 6,367,888 B1 * | 4/2002 | Kee et al. | ......................... | 303/89 |
| 6,652,042 B2 * | 11/2003 | Johnson | ......................... | 303/123 |
| 2004/0036350 A1 * | 2/2004 | Rowe et al. | ..................... | 303/89 |

* cited by examiner

*Primary Examiner* — Pamela Rodriguez

(57) ABSTRACT

A housing has upper and lower faces, front and rear faces and side faces. A vertical bore extends through the housing between the upper and lower faces. A horizontal bore extends into the housing from the front face. The horizontal bore further extends to the vertical bore. A ball valve is positioned within the vertical bore laterally spaced from the horizontal bore. The ball valve is rotatable between open and closed orientations. A lock cylinder is located within the vertical bore. The lock cylinder has an exposed end with a keyway. The lock cylinder has an unexposed end with a connector clip. The connector clip couples the lock cylinder and the ball.

2 Claims, 2 Drawing Sheets

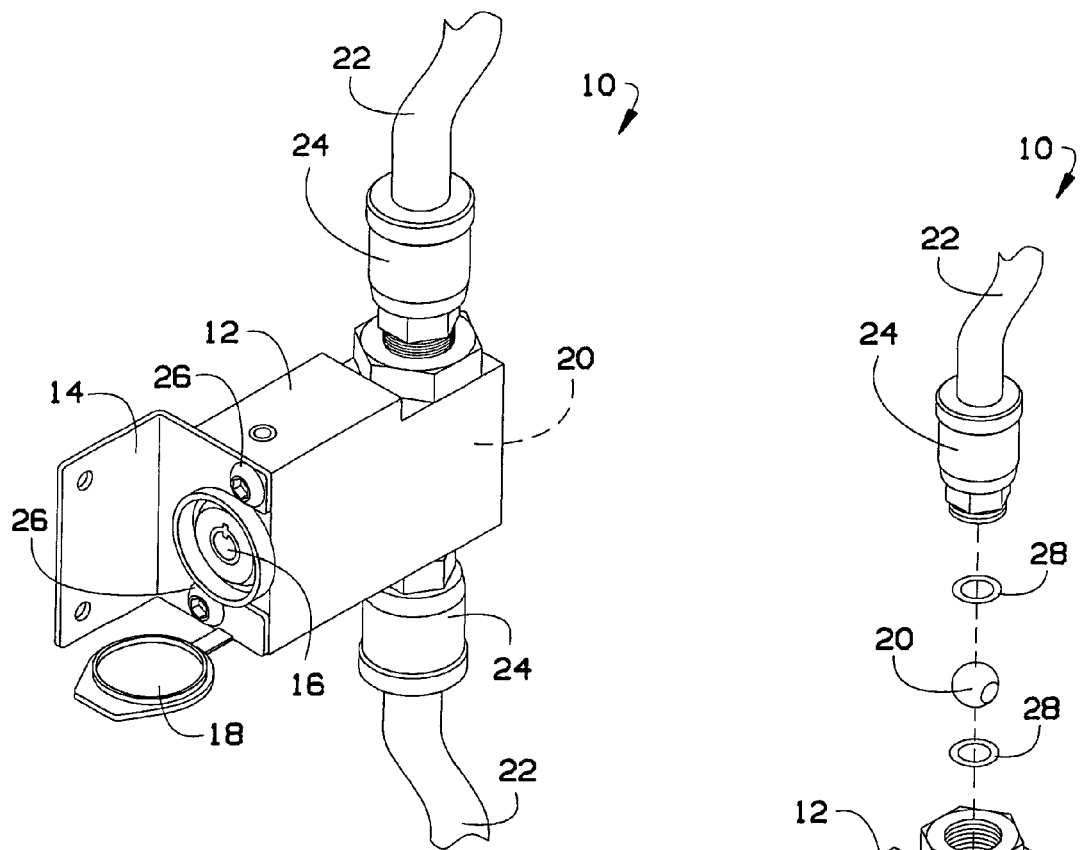
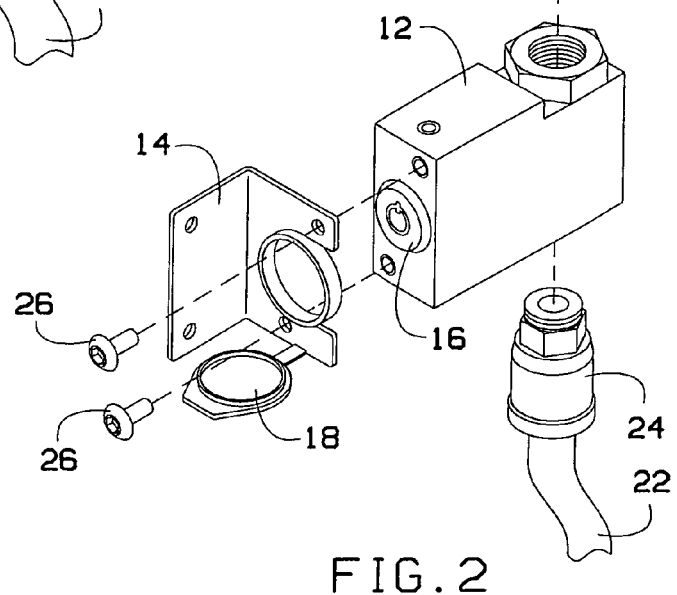

PERMANENT AIR LOCKING MECHANISM

RELATED APPLICATION

The present non-provisional patent application is based upon pending Provisional Patent Application Ser. No. 61/252,786 filed Oct. 19, 2009, the priority of which is claimed and the subject matter of which is incorporated herein by reference.

BACKGROUND OF THE INVENTION

Field of the Invention

The present invention relates to a permanent air locking mechanism and more particularly pertains to for locking out air flow to trailer brakes thereby precluding the possibility of theft, the locking out and precluding being done in a safe, convenient and economical manner.

The present invention relates to a permanently mounted, free standing, air locking mechanism, which is introduced into an air line fed by the tractor's air compressor which feeds pressurized air into and though the trailers glad hand fitting which ultimately raises the trailers brakes. The device can only be applied when the air or hydraulic lines are depressurized. The device can replace a portable glad hand lock which plugs the air hole in the glad hand fitting from receiving air from the tractor. By locking out the ability to energize the air brake line which subsequently raises the brakes of a trailer you preclude theft of the trailer. The purpose of this device is a theft deterrent and safety application. Theft of a trailer can be prevented by securing the air brakes in a locked position, by not allowing air to raise or energize the brakes making the trailer mobile. For safety, the device prevents someone from hooking up a tractor to a trailer and moving it, with the possibility of someone inside, thereby preventing bodily harm to the person inside the trailer.

The system of the present invention can be mounted anywhere on the trailers air line thereby allowing it to be overt or covert as the case may be. Since the device has no equal in the market, thieves would not recognize the device as a security feature and would thereby not attempt at a bypass.

Prior Art as outlined in US Application Number 2004/0036350 deals with a built-in electronic valve which can be actuated off site to reduce air flow into the air lines. Such a device requires significant changes to the truck and trailers air brake system while this technology is seamless and does not affect the braking in any way. The patent U.S. Pat. No. 6,367,888 additionally deals with an electronically deployed solenoid and valve assembly that operates by radio frequency signals to an air valve assembly thereby locking the air from a line. The U.S. Pat. No. 6,652,042 most resembles the utility of the system of the present invention however operates based on escaping air from the air line deploying a plug from within a redesigned glad hand fitting. The device operates as a stand alone system that is extremely complex and involves a set of custom made components that work with one another to move the internal piston through the specialized glad hand fitting to lock out the air. The device deploys itself using pressurized air held in the trailers air line when the air fitting is extracted, while the system of the present invention operates manually and can only be engaged when the line is depressurized and lock is turned by hand which in turn rotates the imbedded ball valve rather than locking automatically using the internal piston. This prior art design requires a special keyway to release the piston which can jam or fail to deploy causing the trailer to be effectively out of service. This device requires a complete redesign of both the glad hand fitting and lines while the system of the present invention affects only the air intake line from the tractor and is assembled in minutes and deployed manually in seconds, once the line is bled of air. This U.S. Pat. No. 6,652,042 device is only usable where there is sufficient footprint to mount the large box of the device and its components on the face of the trailer while the system of the present invention is extremely small and adaptable to any trailer or chassis configuration using air to engage and release the brakes.

The product can also be used in hydraulic applications where locking out a depressurized hydraulic line can stop a thief from moving a piece of construction equipment. The system of the present invention can be mounted anywhere in a hydraulic line such that actuation can be overt or covert for the user.

SUMMARY OF THE INVENTION

In view of the foregoing disadvantages inherent in the known types of air locking systems of known designs and configurations now present in the prior art, the present invention provides an improved permanent air locking mechanism. As such, the general purpose of the present invention, which will be described subsequently in greater detail, is to provide a new and improved permanent air locking mechanism and method which has all the advantages of the prior art and none of the disadvantages.

To attain this, the present invention essentially comprises a permanent air locking mechanism. First provided is an outer housing. The housing is provided in a generally rectangular configuration. The housing has an upper face. The housing has a horizontal lower face. The housing has a vertical front face. The housing has a rear face. The rear face is provided parallel with the front face. The housing also has vertical side faces. The side faces are provided parallel with each other. The side faces couple the upper and lower faces and the front and rear faces. The upper face is provided adjacent to the front face. The upper face is spaced from the lower face by a first height. The upper face is provided adjacent to the rear face. The upper face is spaced from the lower face by a second height. The second height is less than the first height.

A vertical bore is provided. The vertical bore extends through the housing between the upper and lower faces adjacent to the rear face. The vertical bore has female threads. The female threads are provided adjacent to the upper face and to the lower face.

A horizontal bore is provided. The horizontal bore extends into the housing from the front face. The horizontal bore further extends to the vertical bore.

A mounting bracket 14 is provided. The mounting bracket is provided in an L-shaped configuration. The mounting bracket has a vertical front face. The mounting bracket has a vertical side face. The front face of the bracket is provided in contact with the front face of the housing. The front face of the bracket has a recess. An annular collar is provided. The annular collar surrounds and exposes the horizontal bore. The side face of the mounting bracket has apertures. In this manner the mechanism may be mounted to a recipient surface of a tractor. The front face of the mounting bracket has apertures. Screws are provided. In this manner the mounting bracket may be secured to the outer housing. An elastomeric waterproof covering is provided. The waterproof covering is coupled to the front face of the mounting bracket. The waterproof covering is movable between an operative orientation and an inoperative orientation. In the operative orientation the waterproof covering covers the annular collar. In this inoperative orientation the waterproof covering is remote from the annular collar.

A ball valve is provided next. The ball valve is positioned within the vertical bore. The ball valve is laterally spaced from the horizontal bore. Upper and lower O-rings are provided. The O-rings are provided in contact with the ball valve. The ball valve is rotatable between an open orientation and a closed orientation. In the manner of the open orientation a passageway is opened through the vertical bore. In the manner of the closed orientation the passageway through the vertical bore is closed.

Provided next are upper and lower air fluid lines. Upper and lower line fittings are also provided. The line fittings threadedly couple the air fluid lines to the threads of the vertical bore. In this manner a flow of pressurized air from the tractor to the trailer is provided. Further in this manner the brakes of the trailer may be operated.

Provided last is a lock cylinder. The lock cylinder is located within the vertical bore. The lock cylinder has an exposed end. The exposed end has a keyway. The keyway is provided within the annular collar. The lock cylinder has an unexposed end. The unexposed end has a connector clip. The connector clip couples the lock cylinder and the ball valve. In this manner when a key is inserted into the keyway and rotated 90 degrees in a first direction, the ball valve will be opened. Also in this manner the flow of fluid is allowed through the air fluid lines and the vertical bore of the housing. Also in this manner when a key is inserted into the keyway and rotated 90 degrees in a second direction, the ball valve will be closed. Further in this manner the flow of fluid is precluded through the air fluid lines and the vertical bore of the housing.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved permanent air locking mechanism which has all of the advantages of the prior art air locking systems of known designs and configurations and none of the disadvantages.

It is another object of the present invention to provide a new and improved permanent air locking mechanism which may be easily and efficiently manufactured and marketed.

It is further object of the present invention to provide a new and improved permanent air locking mechanism which is of durable and reliable constructions.

An even further object of the present invention is to provide a new and improved permanent air locking mechanism which is susceptible of a low cost of manufacture with regard to both materials and labor, and which accordingly is then susceptible of low prices of sale to the consuming public, thereby making such permanent air locking mechanism economically available to the buying public.

Even still another object of the present invention is to provide a permanent air locking mechanism for locking out air flow to trailer brakes thereby precluding the possibility of theft, the locking out and precluding being done in a safe, convenient and economical manner.

Lastly, it is an object of the present invention to provide a new and improved permanent air locking mechanism. A housing has upper and lower faces, front and rear faces and side faces. A vertical bore extends through the housing between the upper and lower faces. A horizontal bore extends into the housing from the front face. The horizontal bore further extends to the vertical bore. A ball valve is positioned within the vertical bore laterally spaced from the horizontal bore. The ball valve is rotatable between open and closed orientations. A lock cylinder is located within the vertical bore. The lock cylinder has an exposed end with a keyway. The lock cylinder has an unexposed end with a connector clip. The connector clip couples the lock cylinder and the ball.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a permanent air locking mechanism constructed in accordance with the principles of the present invention.

FIG. 2 is an exploded perspective illustration of the mechanism of FIG. 1.

The same reference numerals refer to the same parts throughout the various Figures.

DESCRIPTION OF THE PREFERRED EMBODIMENT

Figure 3:
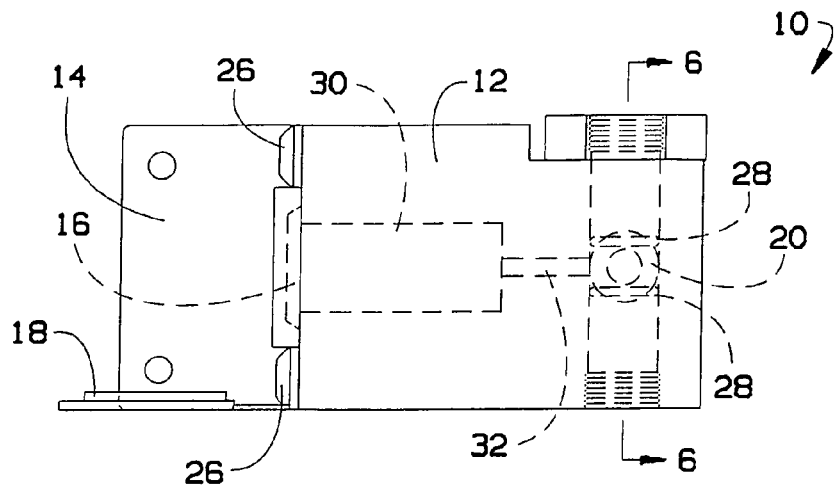
FIG. 3 is a side elevational view of the mechanism shown in FIGS. 1 and 2.
Figure 4:
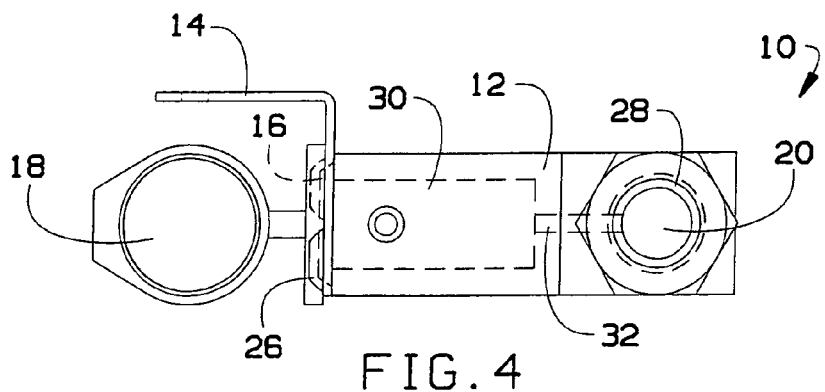
FIG. 4 is a plan view of the mechanism shown in the prior Figures.
Figure 5:
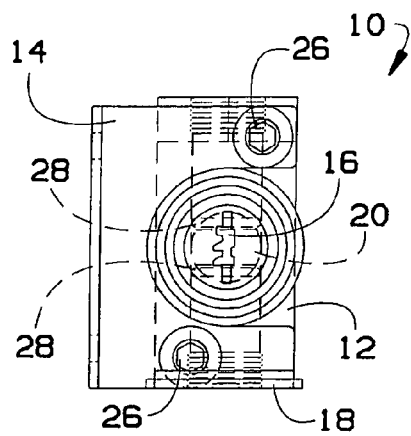
FIG. 5 is a front elevational view of the mechanism shown in the prior Figures.
Figure 6:
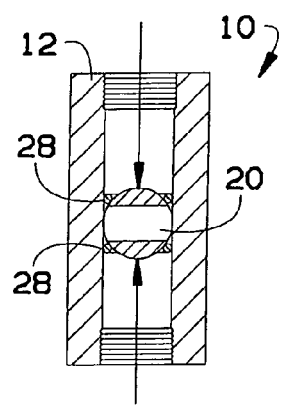
FIG. 6 is a cross sectional view taken along line 6-6 of FIG. 3.
Figure 7:
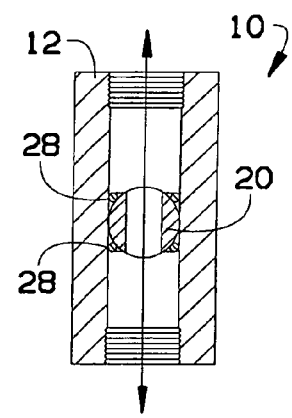
FIG. 7 is a cross sectional view similar to FIG. 6 but with the valve in the open orientation.

With reference now to the drawings, and in particular to FIG. 1 thereof, the preferred embodiment of the new and improved permanent air locking mechanism embodying the principles and concepts of the present invention and generally designated by the reference numeral 10 will be described.

The present invention, the permanent air locking mechanism 10 is comprised of a plurality of components. Such components in their broadest context include a housing, a vertical bore, a ball valve and a lock cylinder. Such components are individually configured and correlated with respect to each other so as to attain the desired objective.

First provided is an outer housing 12. The housing is provided in a generally rectangular configuration. The housing has an upper face. The housing has a horizontal lower face. The housing has a vertical front face. The housing has a rear face. The rear face is provided parallel with the front face. The housing also has vertical side faces. The side faces are provided parallel with each other. The side faces couple the upper and lower faces and the front and rear faces. The upper face is provided adjacent to the front face. The upper face is spaced from the lower face by a first height. The upper face is provided adjacent to the rear face. The upper face is spaced from the lower face by a second height. The second height is less than the first height.

A vertical bore is provided. The vertical bore extends through the housing between the upper and lower faces adjacent to the rear face. The vertical bore has female threads. The female threads are provided adjacent to the upper face and to the lower face.

A horizontal bore is provided. The horizontal bore extends into the housing from the front face. The horizontal bore further extends to the vertical bore.

A mounting bracket 14 is provided. The mounting bracket is provided in an L-shaped configuration. The mounting bracket has a vertical front face. The mounting bracket has a vertical side face. The front face of the bracket is provided in contact with the front face of the housing. The front face of the bracket has a recess. An annular collar is provided. The annular collar surrounds and exposes the horizontal bore. The side face of the mounting bracket has apertures. In this manner the mechanism may be mounted to a recipient surface of a tractor. The front face of the mounting bracket has apertures. Screws 26 are provided. In this manner the mounting bracket may be secured to the outer housing. An elastomeric waterproof covering 18 is provided. The waterproof covering is coupled to the front face of the mounting bracket. The waterproof covering is movable between an operative orientation and an inoperative orientation. In the operative orientation the waterproof covering covers the annular collar. In this inoperative orientation the waterproof covering is remote from the annular collar.

A ball valve 20 is provided next. The ball valve is positioned within the vertical bore. The ball valve is laterally spaced from the horizontal bore. Upper and lower O-rings 28 are provided. The O-rings are provided in contact with the ball valve. The ball valve is rotatable between an open orientation and a closed orientation. In the manner of the open orientation a passageway is opened through the vertical bore. In the manner of the closed orientation the passageway through the vertical bore is closed. In the preferred embodiment, the O-rings are two teflon gasket washers which are inserted into the housing to hold the ball valve in place and to eliminate any air or fluid leaks. These are specially made gasket washers that have been cut specifically for this device.

Provided next are upper and lower air fluid lines 22. Upper and lower line fittings 24 are also provided. The line fittings threadedly couple the air fluid lines to the threads of the vertical bore. In this manner a flow of pressurized air from the tractor to the trailer is provided. Further in this manner the brakes of the trailer may be operated. The fitting, in the preferred embodiment, are purposefully made in all female so as to make it far more difficult for someone trying to bypass the unit as they would not necessarily know that there was two female fittings in lieu of one each male and female.

Provided last is a lock cylinder 30. The lock cylinder is located within the vertical bore. The lock cylinder has an exposed end. The exposed end has a keyway 16. The keyway is provided within the annular collar. The lock cylinder has an unexposed end. The unexposed end has a connector clip 32. The connector clip couples the lock cylinder and the ball valve. In this manner when a key is inserted into the keyway and rotated 90 degrees in a first direction, the ball valve will be opened. Also in this manner the flow of fluid is allowed through the air fluid lines and the vertical bore of the housing. Also in this manner when a key is inserted into the keyway and rotated 90 degrees in a second direction, the ball valve will be closed. Further in this manner the flow of fluid is precluded through the air fluid lines and the vertical bore of the housing. The keyway is a uniquely designed four sided key that cannot be duplicated. The keyway is permanently pinned to the device. The keyway is made such that drilling it out is impossible and the key and master configurations are our intellectual property from the manufacturer to avoid any possible replication of keys. The key and lock can be mastered or grand mastered based on the needs of the client. The key can only be turned when the line is depressurized and the key is removable after opening or closing the ball valve.

The product is comprised of the following components: The device has three basic components and a mounting bracket. The outer housing is preferably made of aircraft grade aluminum. The outer housing is routed out by a computer controlled machine with critical tolerances to the application. The outer housing incorporates a mounting bracket on it used to affix the device to the trailer or chassis. The design permits use on any configuration trailer. The keyway is a specialized stainless steel lock using a special sided key, that has a weather proof covering and keyway hub suitable to move the ball valve inside. The key cannot be replicated as the blanks are owned by the vendor and licensed by CGM Security Solutions, Inc a Florida Corporation and none are available for general key cutting. The final component is a ball valve currently capable of taking over 500 PSI and is suitable for both air and hydraulic fluids. The ball valve is held in place with two locking nuts and is supported by high compression washers at both ends. The ball valve, when engaged, locks out the air when turned such that air cannot enter the line nor leak from the device.

All elements, housing, ball valve and keyway are essential. The aluminum housing holds the locking key way, hub assembly and ball valve perfectly inside such that these can take the pressure required to block the air.

The key turns the lock which turns the ball valve closed or open, manually, based on the key position. If the ball valve is closed, no air or fluids can be moved through the line. You cannot turn the key unless the line is depressurized and therefore the brakes on the trailer cannot be raised or lowered if the device is engaged. When the brakes are locked in the down positions the trailer cannot move. If used on construction equipment, without hydraulic fluid moving freely, the part sealed off cannot be moved, raised or lowered, making the entire piece of equipment, or component, locked down.

This device can be made on a CNC machine where the aluminum is drilled out, valve inserted and threaded and keyway and hub assembly inserted and secured.

Since there are only three basic functional parts, none are expendable.

Once inserted on to a trailers air line the device is ready to be used. It can only be used by manually turning the key but only when the line is depressurized. To use the device the driver turns the key to lock the ball valve which turn does not permit the introduction of air into the trailers air lines to raise the brakes and subsequently move the trailer. The device can be used when the tractor is detached from the trailer or when the trailer is attached to the tractor with the air lines bled. It is intended to be used when the trailer or tractor/trailer is unattended as a preventative measure to deter theft but becomes a safety feature when trailers are parked at loading docks and dock workers are possibly in the trailer. When the authorized driver returns to the trailer, he turns the key and he then can introduce air into the line so that he can drive the truck and move the trailer.

It can be used in construction equipment or in truck/trailers or in any situation where an air line can be sealed to prevent some action from happening based on the use of that air to perform some action required to operate, move or use a component.

A portable glad hand lock can easily be circumvented by simply removing the entire fitting. Since fittings are easy to come by and inexpensive, any thief can unscrew the fitting along with the lock, change the fitting and introduce air into the line and move the trailer in just seconds. This device prevents anyone from doing that and requires extensive time and skill to circumvent. Even if the thief or unauthorized operator has the proper tools and expertise, the time it would take to bypass the system is extensive and becomes a significant deterrent to theft. The ability to protect a trailer all of the time with a permanently mounted and immediately deployable technology vs. only temporary extraneous protection devices such as portable glad hand locks, differentiate the two technologies. The fact that this device is actuated by hand, manually vs. electronic or air driven devices also differentiates the system of the present invention from other functionally similar devices. No one has ever introduced a manually operated air line brake and seal system or product into a truck trailer. This form of protection is both a barrier and deterrent to theft and a safety component.

The system of the present invention trailer air lock prevents someone from moving a stationery trailer by preventing air to flow to the brakes. The device uses a manually lockable ball valve assembly which is introduced into the air line. When locked, no one can introduce air into the glad hand fitting in order to raise the trailers air brakes and move it. The device replaces portable glad hand locks with a permanently mounted system. It further makes simple work of locking the brakes rather than requiring pneumatic pressure, electronic signaling or other mechanical devices to perform the same function. It is easy to assemble, simple and quick to use, doesn't void truck brake warranties, does not change air line configurations, has no parts that can fail due to air, mechanical or electronic issues and can be operated with no training or require maintenance during its functional life.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A permanent air locking mechanism comprising:
    a housing having upper and lower faces, front and rear faces and side faces;
    a vertical bore extending through the housing between the upper and lower faces and a horizontal bore extending into the housing from the front face and extending to the vertical bore;
    a ball valve positioned within the vertical bore laterally spaced from the horizontal bore, the ball valve being rotatable between open and closed orientations,
    a lock cylinder located within the vertical bore with an exposed keyway and an unexposed end with a connector clip coupling the lock cylinder and the ball valve; and
    a mounting bracket having an L-shaped configuration with a front face and a side face, the front face of the bracket being in contact with the front face of the housing, the front face of the bracket formed with a recess with an annular collar surrounding and exposing the horizontal bore, the side face of the mounting bracket having apertures for mounting the mechanism to a recipient surface of a tractor, the front face of the mounting bracket having apertures and screws for securing the mounting bracket to the outer housing, an elastomeric waterproof covering coupled to the front face of the mounting bracket and movable between an operative orientation covering the annular collar and an inoperative orientation remote from the annular collar.

2. A permanent air locking mechanism for locking out air flow to trailer brakes thereby precluding the possibility of theft, the locking out and precluding being done in a safe, convenient and economical manner, the mechanism comprising, in combination:
    an outer housing in a generally rectangular configuration, the housing having an upper face and a horizontal lower face, a vertical front face and a parallel rear face, and parallel vertical side faces coupling the upper and lower faces and the front and rear faces, the upper face adjacent to the front face being spaced from the lower face by a first height, the upper face adjacent to the rear face being spaced from the lower face by a second height less than the first height;
    a vertical bore extending through the housing between the upper and lower faces adjacent to the rear face, the vertical bore having female threads adjacent to the upper face and to the lower face;
    a horizontal bore extending into the housing from the front face and extending to the vertical bore;
    a mounting bracket having an L-shaped configuration with a vertical front face and a vertical side face, the front face of the bracket being in contact with the front face of the housing, the front face of the bracket formed with a recess with an annular collar surrounding and exposing the horizontal bore, the side face of the mounting bracket having apertures for mounting the mechanism to a recipient surface of a tractor, the front face of the mounting bracket having apertures and screws for securing the mounting bracket to the outer housing, an elastomeric waterproof covering coupled to the front face of the mounting bracket and movable between an operative orientation covering the annular collar and an inoperative orientation remote from the annular collar;

a ball valve positioned within the vertical bore laterally spaced from the horizontal bore, upper and lower O-rings in contact with the ball valve, the ball valve being rotatable between an open orientation to open a passageway through the vertical bore and a closed orientation to close the passageway through the vertical bore;

upper and lower air fluid lines, upper and lower line fittings threadedly coupling the air fluid lines to the threads of the vertical bore to provide a flow of pressurized air from the tractor to the trailer for operating the brakes of the trailer;

a lock cylinder located within the vertical bore, the lock cylinder having an exposed end with a keyway within the annular collar, the lock cylinder having an unexposed end with a connector clip coupling the lock cylinder and the ball valve whereby when a key is inserted into the keyway and rotated 90 degrees in a first direction, the ball valve will be opened to allow the flow of fluid through the air fluid lines and the vertical bore of the housing, and whereby when a key is inserted into the keyway and rotated 90 degrees in a second direction, the ball valve will be closed to preclude the flow of fluid through the air fluid lines and the vertical bore of the housing.

* * * * *